(12) United States Patent
Slichter et al.

(10) Patent No.: US 11,154,011 B2
(45) Date of Patent: Oct. 26, 2021

(54) SYSTEM AND METHOD FOR SENSING AN EDGE

(71) Applicant: Raven Industries, Inc., Sioux Falls, SD (US)

(72) Inventors: James Edward Slichter, Hill City, SD (US); Andrew Joseph Pierson, Sioux Falls, SD (US); Derek Michael Stotz, Sioux Falls, SD (US); Jonathan William Richardson, Douglas, WY (US)

(73) Assignee: Raven Industries, Inc., Sioux Falls, SD (US)

( * ) Notice: Subject to any disclaimer, the term of this patent is extended or adjusted under 35 U.S.C. 154(b) by 250 days.

(21) Appl. No.: 16/258,081

(22) Filed: Jan. 25, 2019

(65) Prior Publication Data

US 2019/0289788 A1   Sep. 26, 2019

Related U.S. Application Data

(63) Continuation of application No. 14/640,740, filed on Mar. 6, 2015, now Pat. No. 10,225,984.
(Continued)

(51) Int. Cl.
*A01D 75/00* (2006.01)
*G01S 17/42* (2006.01)
(Continued)

(52) U.S. Cl.
CPC .......... *A01D 75/00* (2013.01); *A01B 69/007* (2013.01); *G01S 7/4808* (2013.01); *G01S 17/42* (2013.01); *G01S 17/87* (2013.01); *G01S 17/89* (2013.01)

(58) Field of Classification Search
CPC ..... G01F 1/666; G01F 1/662; A01D 41/1273; A01D 41/1277; A01D 41/1272;
(Continued)

(56) References Cited

U.S. PATENT DOCUMENTS 6,668,223 B2   12/2003   Blackmore et al.
7,916,898 B2   3/2011   Anderson
(Continued)

FOREIGN PATENT DOCUMENTS

WO   WO-2012172526 A1   12/2012
WO   WO-2015134886 A1   9/2015

OTHER PUBLICATIONS

"U.S. Appl. No. 14/640,740, Final Office Action dated Mar. 9, 2018", 13 pgs.
(Continued)

*Primary Examiner* — Luke D Ratcliffe
(74) *Attorney, Agent, or Firm* — Schwegman Lundberg & Woessner, P.A.

(57) ABSTRACT

A system and method for sensing an edge of a region includes at least one distance sensor configured to detect a plurality of distances of objects along a plurality of adjacent scan lines. A controller is in communication with the at least one distance sensor and is configured to determine a location of an edge of a region within the plurality of adjacent scan lines. The controller includes a comparator module configured to compare values corresponding to the detected plurality of distances, and an identification module configured to identify the location of the edge of the region according to the compared values. In one example, the values corresponding to the detected plurality of distances include couplets of standard deviations that are analyzed and selected to identify the location of the edge.

14 Claims, 7 Drawing Sheets

Related U.S. Application Data

(60) Provisional application No. 61/948,925, filed on Mar. 6, 2014.

(51) Int. Cl.
    *G01S 17/87*     (2020.01)
    *G01S 17/89*     (2020.01)
    *G01S 7/48*     (2006.01)
    *A01B 69/00*     (2006.01)

(58) Field of Classification Search
CPC .............. G06F 3/0481; G06F 3/04847; G06F 3/04886; H04Q 9/00; G01N 29/14; G01N 29/46; G01N 2291/02466; G01N 2291/02836; G01N 2291/02458; G08C 2201/93; G08C 2201/30
See application file for complete search history.

(56) References Cited

U.S. PATENT DOCUMENTS

| | | | |
|---|---|---|---|
| 8,099,213 B2 | 1/2012 | Zhang et al. | |
| 2002/0193928 A1* | 12/2002 | Beck | A01B 79/005 |
| | | | 701/50 |
| 2004/0264763 A1* | 12/2004 | Mas | G06K 9/00664 |
| | | | 382/154 |
| 2005/0088643 A1 | 4/2005 | Anderson | |
| 2005/0254721 A1 | 11/2005 | Hagiwara | |
| 2010/0017060 A1* | 1/2010 | Zhang | G06T 7/73 |
| | | | 701/41 |
| 2010/0328644 A1 | 12/2010 | Lu et al. | |
| 2015/0253427 A1 | 9/2015 | Slichter et al. | |

OTHER PUBLICATIONS

"U.S. Appl. No. 14/640,740, Non Final Office Action dated Jul. 13, 2017", 12 pgs.

"U.S. Appl. No. 14/640,740, Notice of Allowance dated Oct. 25, 2018", 6 pgs.

"U.S. Appl. No. 14/640,740, Response filed Sep. 6, 2018 to Final Office Action dated Mar. 9, 2018", 16 pgs.

"U.S. Appl. No. 14/640,740, Response filed Dec. 6, 2017 to Non Final Office Action dated Jul. 13, 2017", 16 pgs.

"International Application Serial No. PCT/US2015/019211, International Preliminary Report on Patentability dated May 27, 2016", 5 pgs.

"International Application Serial No. PCT/US2015/019211, International Search Report dated Jun. 11, 2015", 2 pgs.

"International Application Serial No. PCT/US2015/019211, Written Opinion dated Jun. 11, 2015", 9 pgs.

\* cited by examiner

SYSTEM AND METHOD FOR SENSING AN EDGE

RELATED APPLICATION

This patent application id a continuation of U.S. patent application Ser. No. 14/640,740, filed on Mar. 6, 2015, which application claims the benefit of priority, under 35 U.S.C. Section 119(e), to Slichter et al., U.S. Provisional Patent Application Ser. No. 61/948,925, entitled "SYSTEM AND METHOD FOR SENSING AN EDGE," filed on Mar. 6, 2014, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries. Inc. Sioux Falls. S. Dak. All Rights Reserved.

TECHNICAL FIELD

This document pertains generally, but not by way of limitation, to systems and methods for sensing variations in oncoming terrain.

BACKGROUND

Navigation of a vehicle (powered or unpowered) along an edge of a space, for instance an edge of a field or a cut line edge is manually accomplished by steering a corner reference point of a vehicle along an edge. As the vehicle passes through the space a new edge is formed, for instance by cutting of an agricultural crop or a furrow created by the passage of a wheel (coulter, runner or the like). The machine is then steered along the new edge, and the process is repeated until the field is fully cut (harvested, planted or the like) or navigated (e.g., plowed or the like).

In some examples, GPS systems are used along with GPS antennas on vehicles to sense and detect the position, heading, speed and the like of a vehicle within a space, such as a field. These values are fed to the vehicle to assist in navigation of the vehicle through the field (e.g., as navigation cues). Optionally, the values are fed to an automated steering system that correspondingly steers the vehicle along a desired path in the space.

Overview

The present inventors have recognized, among other things, that a problem to be solved can include providing an accurate and reliable automatic identification of the edge of a region, for instance a cut edge of an agricultural crop during harvesting. In some examples, an operator identifies the edge of the region (e.g., an edge of a field) and then navigates a corresponding end of a cutting implement such as a harvester into rough alignment with the edge. Stated another way, there is necessarily some wandering of the vehicle based on operator error. In other examples, GPS systems are used to monitor the location of a vehicle and provide navigation (automated steering or cues) to ensure the vehicle follows a specified path or map of the region. GPS systems provide a resolution of around 1 to 3 meters and accordingly some of the crop (or optionally grass or snow) may be missed as the vehicle is guided along a specified path and not accurately along an edge of the region and are subject to atmospheric interference. Inaccuracies of guidance (whether manual or automated) create a cascading effect with corresponding increases in coverage errors as trailing vehicles follow errant lead vehicles while also introducing their own errors in coverage. Optionally, more precise positioning may be obtained for instance with a CORS network or an RTK (real time kinematics) base station correction but such augmentation methods are significantly more expensive than basic GPS, and incorporate other forms of error introduced by way of differences of position between the vehicle and the CORS or RTK base station.

In an example, the present subject matter can provide a solution to this problem, such as by the inclusion of a system for sensing an edge of a region. The system includes at least one distance sensor (e.g., a reflectivity based distance sensor) that scans along a series of scan lines and determines the distance to objects (e.g., terrain, crops or the like) along each of the scan lines. A controller interprets values corresponding to the detected distances (e.g., standard deviations or the like) and identifies the location of the edge of the region, such as a cut edge, tram line or the like, for instance based on the smallest stored standard deviation. Optionally a navigation module, such as an automated steering system is provided that navigates a vehicle, for instance a cutting implement, so that a desired portion of the vehicle such as an end of the cutting implement is aligned with and guided along the identified edge (e.g., maintained along the edge during cutting). In another example, the system determines an updated location of an edge after having moved through the region (such as after harvesting along a passage). The system identifies the updated location of the edge and where applicable navigates the vehicle to align a portion of the vehicle with the updated edge. Similarly, where multiple vehicles, for instance a lead combine and trailing combines each include the system described herein, each of the combines is able to identify and navigate along a respective edge. In the case of the lead combine, the last cut line of the preceding pass, and in the case of trailing combines the cut edge of the proceeding combines. Further still, the systems and methods described herein are not subject to atmospheric interference in the manner of a GPS system or error introduced by range between the vehicle and a CORS or RTK reference station.

Although the system has been described in regard to agricultural harvesting (e.g., hay, corn, soy beans or the like), the system is also usable with any area or region including an identifiable edge including, but not limited to, lawns, snow removal or the like. The systems and algorithms described herein are versatile and configured to identify the location of an edge and cooperate with navigation systems to guide a vehicle relative to identified location of the edge.

The present inventors have recognized, among other things, that a problem to be solved can include minimizing processor power needs and accordingly decreasing the response time of edge detection for automated steering system. In some examples, systems that provide thousands of data points by way of laser generators and rotating mirrors provide a high throughput of data that saturates the processing power of most field computers. Accordingly, even if such systems were configured to identify the edge of a region (e.g., a cut edge) these systems would be unable to respond quickly enough (with the location of the edge) to ensure accurate guidance of a vehicle along such an edge. In still other examples, pixel based machine vision systems are used to assess and interpret information on a pixel by pixel basis. In a similar manner to the previously described system, pixel analysis is processor intensive and accordingly may not provide the desired responsiveness. In still other examples, color based machine vision is used to detect and identify terrain features (e.g., corn stalks have differing color relative to the ground). In a region with consistent coloration, such as a hay field, wheat field or the like, the use of color analysis frustrates the identification of the edge of the region.

In an example, the present subject matter can provide a solution to this problem, such as by the inclusion of a system for sensing an edge of a region. The system described herein uses at least one distance sensor to scan along a series of scan lines (e.g., 16 scan lines) and accordingly determines the distance to objects along the scan lines. Optionally, reflectivity is used as measured characteristic to determine distances and is accordingly not subject to lack of variations in color. Values corresponding to the detected distances are analyzed (compared) to identify the location of the edge. For instance, each scan (e.g., 16 distance measurements based on 16 scan lines) is assessed based on couplets of standard deviations. The couplets are generated with varying subsets of the 16 distance measurements. The highest standard deviation of each couplet (e.g. 5 or more total couplets) is cataloged and then compared. The smallest cataloged standard deviation corresponds to the edge of the region. Optionally, the location of the edge is then indexed to the corresponding scan line to thereby identify the location of the edge relative to the position of the at least one distance sensor.

The system uses a limited number of points (relative to the thousands of points used in a laser and mirror based system) and a comparative algorithm to identify the edge location. The processor power needed for the system is less than that needed for laser systems and pixel based systems (e.g., webcams or the like), and is also able to measure distances and identify edges without utilizing color differentiation. Stated another way, the systems and methods described herein allow for the identification of the location of the edge multiple times per second with a smaller number of data points and a comparative algorithm using those data points.

This overview is intended to provide an overview of subject matter of the present patent application. It is not intended to provide an exclusive or exhaustive explanation of the invention. The detailed description is included to provide further information about the present patent application.

BRIEF DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
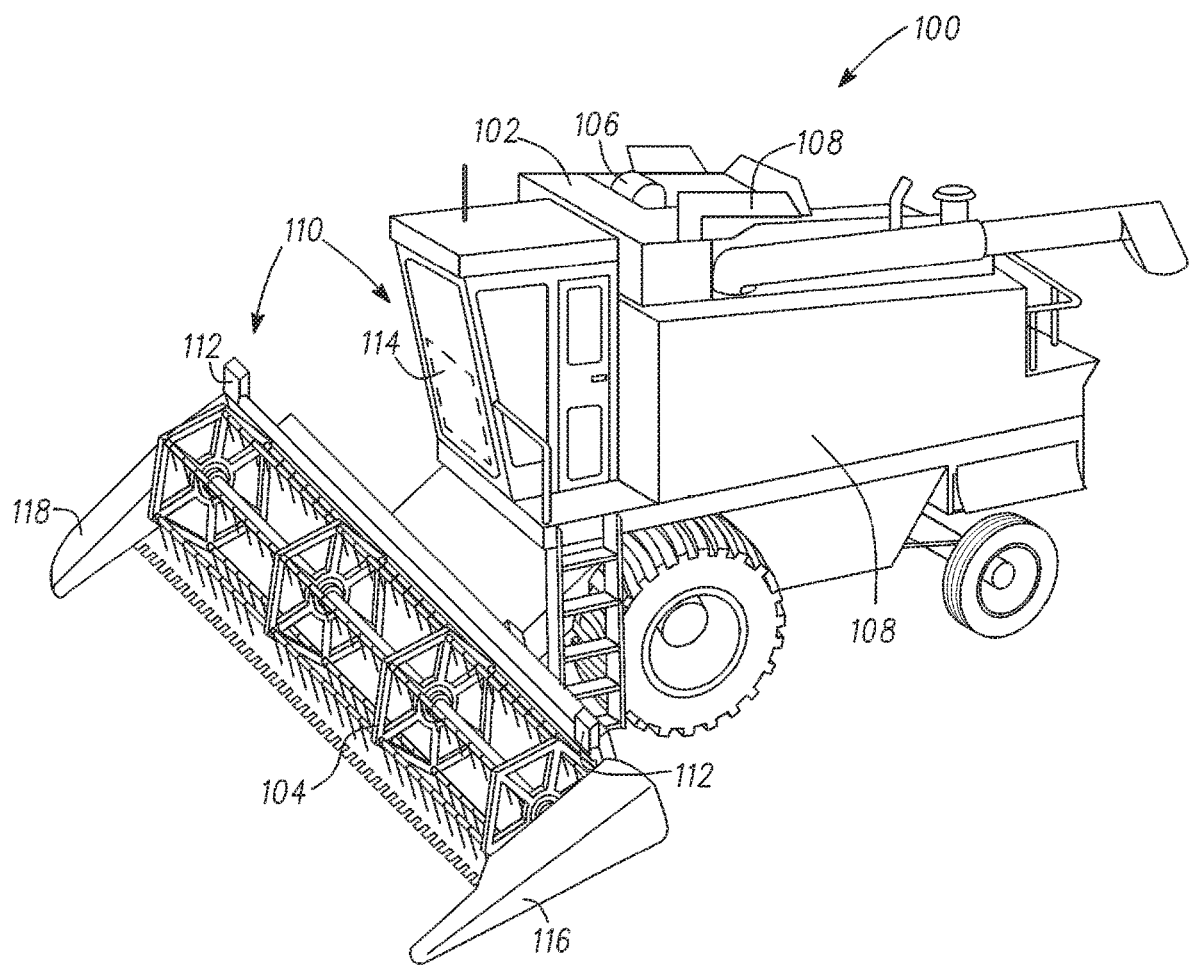
FIG. 1 is a perspective view of one example of a vehicle including a system for sensing an edge of a region.

FIG. 1 shows one example of a harvester such as a harvester 100. As shown the harvester 100 includes a body 102 (a vehicle body) and a header 104 movably coupled with the body 102. In one example the header 104 is used to cut and divide crops (e.g., wheat, corn, soybeans or the like) and deliver the crops into the body 102 for further processing. In one example the harvester 100 includes a harvester elevator 106 configured to remove processed crops from the internal mechanisms of the harvester 100 and deposit the grain within a grain tank 108.

Figure 6A:
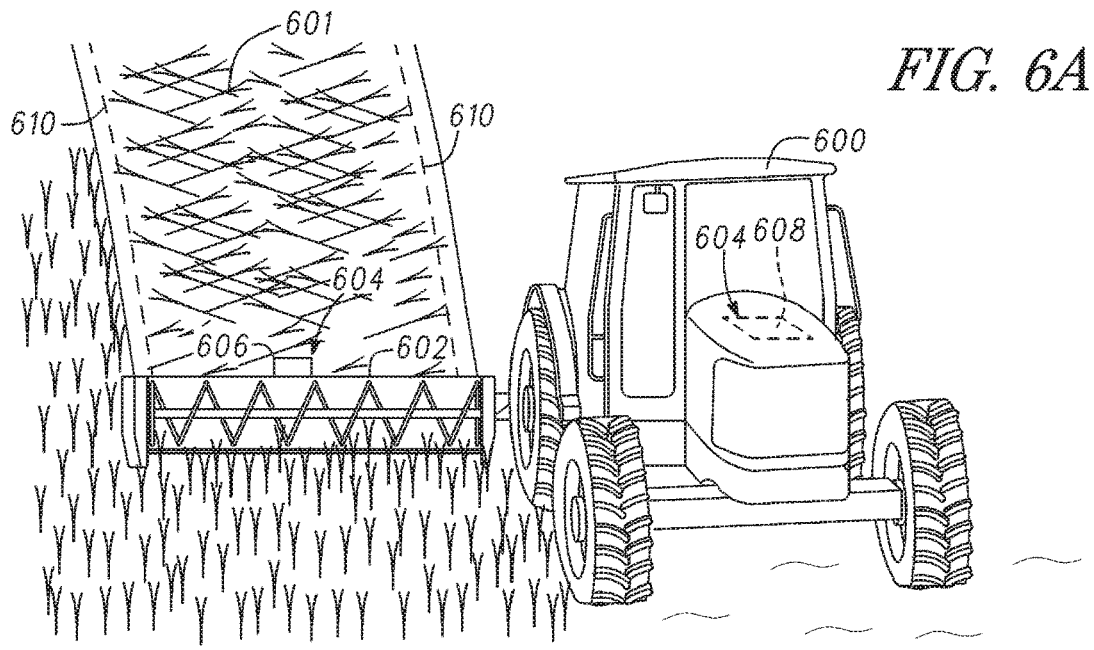
FIG. 6A is a schematic diagram showing one example of a harvested crop.

Referring again to FIG. 1 the harvester 100 includes an edge sensing system 110. As described herein, the edge sensing system 110 facilitates the guidance of a vehicle, for instance an agricultural vehicle, through fields including crops planted in rows (corn) or crops that are not planted in rows (soybeans, hay, wheat or the like) through sensing and identification of an edge. Additionally, the edge sensing system 110 is used in another example to sense and identify harvested crops (e.g., windrows of hay or other crops) in a field and generate yield values (as shown in FIGS. 6A, B). Further still, the edge sensing systems described herein sense the edge of a mowed lawn, plowed snow, gravel, dirt, debris or objects and navigate or guide a corresponding mower, snow plow, road grader, loader or the like on corresponding terrain (e.g., a homeowner's lawn, golf course, road way, construction site or the like).

In the example shown in FIG. 1, the edge sensing system 110 includes one or more distance sensors 112. As shown in FIG. 1, the distance sensors 112 are in the example associated with each of the first and second ends 116, 118 of the header 104. The distance sensors 112 are in communication with a controller 114 (e.g., within the cab of the harvester 100). In one example the controller 104 is a module included with a field computer of the harvester 100. In another example the controller 114 is an add-on module either configured to operate on its own or in communication with the field computer of the harvester 100. The distance sensors 112 communicate with the controller 114 with one or more connections including, but not limited to, wireless, Bluetooth, wired, infrared, radio connections or the like.

As shown in FIG. 1, the distance sensors 112 are in one example provided at the first and second ends 116, 118. As described herein the distance sensors 112 measure one or more distances (e.g., along a plurality scan lines) relative to the distance sensors 112. The distance sensors 112 (in combination with the controller 114) are thereby able to detect an edge, for instance an edge of a field or the edge of a portion of a field corresponding to the interface of the harvested and unharvested portions, and identify the edge to provide navigational cues or navigation of the harvester 100 into alignment with the edge of the field. For instance, the controller 114 interprets the distances measured by the distance sensors 112 to accordingly identify the edge. After identification of the edge the controller 114 provides one or more navigational cues (whether visual tactile, auditory or the like) to the operator to facilitate navigation of the harvester 100 along the edge of the crop for harvesting. In another example, the controller 114 is in communication with an automated steering mechanism such as a navigation module in communication with the harvester 100 steering system. The identified edge location is used by the controller 114 with the navigation module to provide automated steering to the harvester 100 to guide the harvester 100 (for instance one of the first end or second end 116, 118) into alignment with the edge of the crop for harvesting. In either example, the controller 114 in combination with the distance sensors 112 of the edge sensing system 110 identifies the edge of a field (the edge of unharvested crops) for harvesting and facilitates the operation of the harvester 100 to readily align one or more of the first or second ends 116, 118 with the edge of the crop and thereby ensure an accurate and precise harvesting of the crop with the full width (swath) of the header 104. As described herein the edge sensing system 110 ensures that the harvester 100 is able to accurately track along the edge of crops to thereby more efficiently use the entire width of the header 104 and minimize undesirable steering issues including operator error, wandering of the vehicle from the edge of the crops or the like. Further, the edge sensing system facilitates the alignment and navigation of the harvester precisely along the edge of the unharvested crops with resolution not available in other navigation and position systems (e.g., GPS. RTK systems or the like).

As shown in FIG. 1 the distance sensors 112 are in one example provided at the first and second ends 116, 118 of the header 104. The distance sensors 112 are provided at the first and second ends 116, 118 to facilitate automatic alignment of the first or second ends with the identified edge of the coincident sensors 112. The edge sensed by the distance sensors 112 and identified by the controller 114 is automatically aligned with one or more of the first and second ends 116, 118 according to their alignment with the respective distance sensors 112.

In another example, the distance sensors 112 are offset from the first and second ends 116, 118 for instance by one or more specified distances. In one example the distance sensors 112 include a single distance sensor 112 provided centrally along the header 104 (or on the vehicle body 102). The width of the header 104 for instance the distance of the first and second ends 116, 118 and the offset distance of the sensor 112 from the ends is input to the controller 114. The distance sensor 112 is thereby able to measure the distances in front of the header 104 including detecting distances corresponding to the location of an edge of a crop for harvesting (appearing as a closer distance measurement relative to open previously harvested or unplanted areas of the field). The measurements of the distance sensors 112 are interpreted by the controller 114 to again identify the location of the edge. The controller 114 adjusts the location of the edge according to the offset of the distance sensor 112 from either of the first or second ends 116, 118. Accordingly, the controller (or operator) assesses which of the first or second ends 116, 118 is closest to the edge of the unharvested crop to ensure the header 104 harvests. The controller 114 uses the selected first or second end 116, 118 to accordingly identify the edge location and then index the identified location relative to the selected end 116, 118. The identified edge location is thereby indexed relative to either of the first or second ends 116, 118 to ensure alignment of the first or second ends 116, 118 for harvesting (e.g., by navigational cues or automated steering).

The distance sensors 112 as described herein include one or more of a plurality of different sensor types including but not limited to ultrasonic sensors, machine vision sensors, web cameras, reflectivity based sensors (for instance used in combination with a spotlight or other light generating device), a light emitting diode (LED) generator in combination with a reflectivity sensor, a laser generator in combination with a reflectivity sensor or the like. In one example, one or more of the sensors generates a plurality of scan lines for instance 16 discreet scan lines originating from each of the distance sensors 112. As will be described herein distance measurements are in one example taken along each of the scan lines and communicated to the controller 114 for interpretation and identification of the edge location of the region. In one example, the distance sensor 112 generates a fan of light composed of multiple separate beams (e.g., 16 or more scan lines), and the distance of each beam from the sensor to reflectance is measured simultaneously. The measurements are repeated at a specified frequency to accordingly follow the edge of the region (e.g., unharvested crops) in an ongoing fashion as the harvester 100 moves through the field. As described herein, by limiting scanning to a plurality of scan lines (e.g., 16, 32, 64, 128 or the like) processing power for the controller 114 and scan rate limits (thousands of pixels or more for vision systems) for the distance sensors 112 are not approached or exceeded. Instead, with the edge sensing system 110 scanning and analysis of the scans is repeated in a rapid fashion to ensure ongoing timely identification of the edge. In contrast, machine vision systems using scans including thousands or millions of pixels and corresponding processor power are not needed.

Although the systems and methods described herein are shown in the context of an exemplary harvester 100, the disclosure is not limited to harvesters 100. Instead, the systems and methods are applicable to any system (whether static or moving) that would benefit from sensing an edge, such as the edge of a crop for harvesting, the edge of material for removal (snow, gravel, soil, compost, garbage or the like), the edge of a road or passage or the like. For instance, the systems and methods described herein are used with vehicles including, but not limited to, harvesters, mowers, snow plows, road graders, loaders, bulldozers, automobiles, tractor trailers, aircraft, UAVs, drones or the like.

Figure 2:
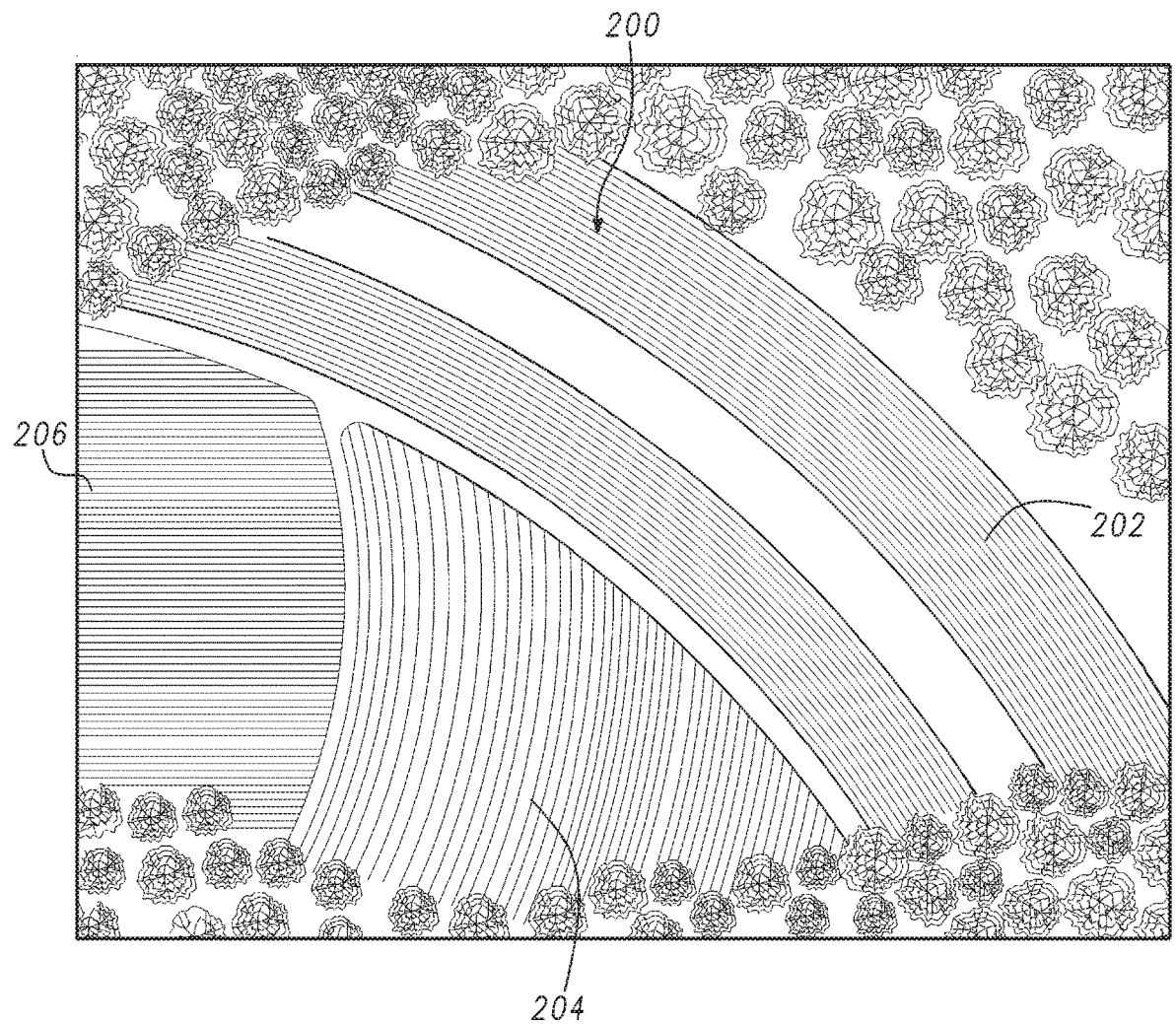
FIG. 2 is an example of a field including a plurality of edge locations including supplemental or progressive edge locations formed through harvesting or removal of material.

FIG. 2 shows a plot of one example of a field 200. As shown the field 200 includes a plurality of rows 202, 204, 206 having varying shapes and lengths extending across the field 200. As further shown in FIG. 2 at least some of the rows 202, 204, 206 have a nonlinear shape and accordingly constant or near constant attention is used to provide course adjustments to ensure a vehicle, such as the harvester 100, tracks along an edge of the rows during harvesting. By using the edge sensing system 110 provided herein one or more of the distance sensors 112 is able to sense the edge of the field for instance an ongoing edge of the unharvested crops that changes with harvesting and thereby provide an identified edge location (by way of the controller 114) to the operator in an ongoing fashion. In another example, the controller 114 provides the identified edge location to a navigation module that provides automated steering to the harvester 100 to guide the harvester 100 (for instance a first or second end 116, 118 of the header 104) along the edge of the field in an ongoing manner that tracks along a linear or nonlinear edge. The edge sensing system 110 thereby facilitates the continued detection and identification of an edge, including a nonlinear edge, for ongoing guidance of the harvester 100 including alignment of one of the first or section ends 116, 118 with the edge of the unharvested crops (whether linear or non-linear).

As the harvester 100 moves through the field 200 the indexed edge of the field, for instance corresponding to the edge of unharvested crops ready changes. That is to say, a new edge is formed with the harvesting operation according to the width of the harvester header 104. This new supplemental edge trails after the harvester 100 and is detected and identified by the edge sensing system 110 on a return pass by the harvester 100. As the harvester turns to make another pass along the rows 202, 204, 206 the edge sensing system 110, for instance an opposed distance sensor 112 of the pair of distance sensors 112 shown in FIG. 1, senses the supplemental edge of the field, identifies the supplemental edge and provides one or more of guidance cues or navigation instructions to align the harvester along the supplemental edge.

In another example, where a train of vehicles such as a plurality of staggered harvesters 100 are used in combination each of the harvesters is able to follow the supplemental edge created by the immediately leading harvester of the train. That is to say, the edge sensing system 110 is duplicated in each of the harvesters to ensure that the leading harvester tracks along an edge of the field identified with the edge sensing system 110 and the trailing harvesters thereby track their respective headers 104 along the supplemental edges created by preceding harvesters 100.

In still another example, the edge sensing system 110 is provided with trailing harvesters 100. A GPS system or other location sensing system such as real time kinetics (RTK) is used with the lead harvester for navigation through the field land lead harvesting. The trailing harvesters then follow the cut edge (supplemental edge) formed by the lead harvester (and intervening harvesters) using the edge sensing system 110. One or more of navigation cues or automated steering is provided with the edge sensing system 110 to ensure that the trailing harvesters 100 track along the supplemental edge generated by the lead harvester 100.

By using the edge sensing system 110 as described herein for instance with a single harvester 100 or a staggered series of harvesters 100 a field such as the field 200 including the plurality of rows 202, 204, 206 is efficiently harvested. For instance, the harvester 100 is guided along an identified edge of a crop for harvesting as well as the supplemental edges created by the harvester 100 as it moves through the field and harvests crops. Wandering of the harvester 100 by visual estimation of the edge of the crop by the operator or a lack of attention in making course adjustments to follow the edge of the crops is avoided. Instead, the controller 114 in combination with the distance sensors 112 of the edge sensing system 110 accurately and consistently identifies the edge of the field (unharvested crops) and conveys the indexed location of the edge to the operator (e.g., with guidance cues) or to an automated steering system and ensures that the harvester 100 (the first or second ends 116, 118 of the header 104) is aligned with the edge of the crops. The harvester 100 accurately and efficiently uses the full width of the header 104 to maximize the harvest of the crops with each pass of the harvester 100.

Figure 3:
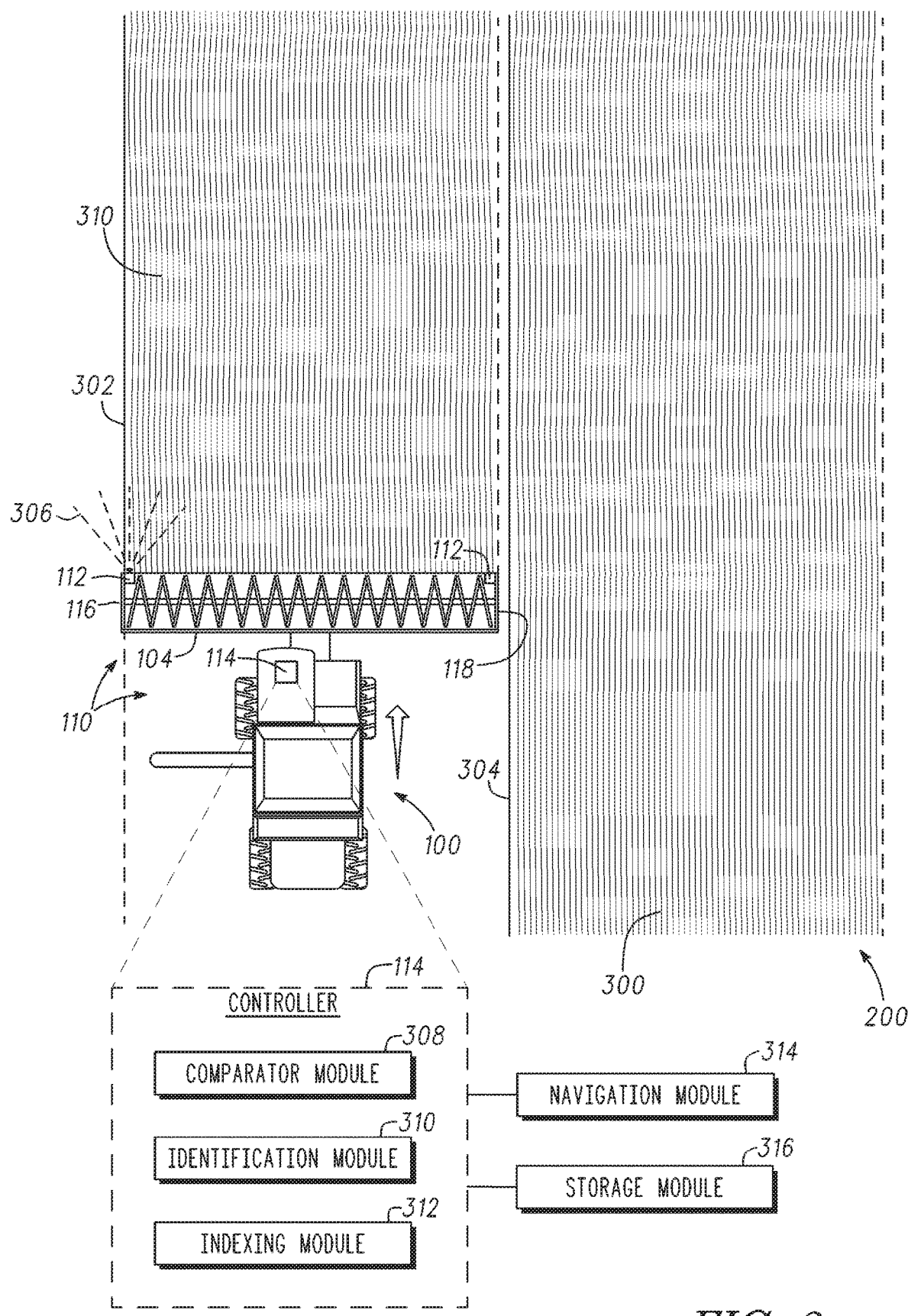
FIG. 3 is a schematic view of the vehicle of FIG. 1 including the system for sensing an edge of a region.

Referring now to FIG. 3 one example schematic of a field, such as the field 200, is shown. A harvester 100 is shown in the process of harvesting one or more rows of the field 200. In the example shown in FIG. 3, the field 200 includes a plurality of edges. As shown on the leftmost portion the edge 302 is provided in a substantially aligned configuration with a first end 116 of the header 104 of the harvester 100. As will be described herein, the edge detection system 110 operates to scan the edge 302 and accordingly identify and index the edge 302 to one or more of the scan lines 306 to facilitate the guidance or navigation cues for an operator to guide the harvester 100 into the orientation shown along the edge 302.

As further shown in FIG. 3, a supplemental edge 304 is formed by the harvester 100 as it harvests the crops 300. In one example where the harvester 100 turns around for a second pass through the field 200 the opposed side of the header 104, for instance the second end 118, is aligned with the supplemental edge 304. In such an example, the distance sensors 112 associated with the second end 118 are directed along the supplemental edge 304 and operate in a similar manner to the distance sensors 112 associated with the first end 116 shown in FIG. 3. Accordingly, the edge detection system 110 as described herein is able to detect the edges 302 of the crops 300 including for instance a left-sided edge 302 as shown in FIG. 3 and a right-sided edge 304 (once the harvester 100 is turned) to accordingly identify the edge and in at least some examples provide navigation cues or automated steering to the harvester 100 to guide the harvester. Referring again to FIG. 3, the edge sensing system 110 is shown operating relative to the crops 300. For instance, the distance sensor 112 associated with the first end 116 provides a plurality of scan lines 306. In one example, the distance sensor 110 scans in a staggered fashion or at the same time along each of the scan lines 306. The distance sensor is thereby able to make a plurality of distance measurements continuously in a fan shaped array as shown in FIG. 3. The distance measurements taken by the distance sensors 112 are transmitted to the controller 114. The controller 114 as previously described herein interprets the distance measurements from each of the sensors 112, in this case the distance sensor 112 associated with the first end 116, and identifies the edge 302. As discussed herein the identified edge is optionally used to provide one or more of navigation cues to an operator or automated steering commands by way of a navigation module to automatically steer the harvester 100.

Optionally, the controller 114 includes one or more filters configured to filter out errant measurement values including, but not limited to, noise, multi-value measurements for a scan line or the like. For instance, in one example, the controller 114 filters measurements that are much greater (e.g., distance measurements) than surrounding measurements that otherwise indicate the presence of objects, such as crops. In another example, the controller filters 114 out multi-value measurements. For instance, if the distance sensor 112 measures two values for a scan line the larger of the two (indicating open ground) is optionally discarded in favor of the smaller value that indicates an object, such as a crop. In another example, after filtering of the measurements (e.g., taken along the scan lines during a scan of the sensor 112) the left and right values of the scan are identified. In one example for the left sensor 112, one of the scan lines on the left side is identified as the left end value based on at least one or a pattern of longer distance measurements (e.g., meeting or exceeding a long threshold). Another of the scan lines on the right side is identified as the right end value based on at least one or a consistent pattern of shorter distance measurements (e.g., meeting or exceeding a short threshold). The left and right values and their corresponding scan lines are used as first and last values in the analysis discussed herein including, but not limited to, generation and comparison of standard deviation couplets.

As shown in FIG. 3 the distance sensors 112 associated with the first end 116 are used with a left-handed edge 302. In another example for instance where the harvester 100 is turned around, the distance sensors 112 associated with the second end 118 are used with the supplemental edge 304 to provide a right-handed aligned cut along the supplemental edge 304 for the harvester 100. Accordingly, with repeated passes of the harvester 100 and use of the edge sensing system 110 accurate cuts configured to extend precisely along each of the edges 302 and supplemental edges 304 (as these edges are formed in the field 200) harvests the crops 300 in an efficient and rapid manner without unnecessary wandering of the harvester 100. In a similar manner, vehicles trailing the harvester 100 for instance a team of harvesters 100 in a staggered configuration use their own edge sensing systems 110 with the supplemental edge 304 to align respective headers 104 (e.g., respective first ends 116 or second ends 118) with the supplemental edge.

Referring again to FIG. 3 the controller 114 is shown. The controller communicates with each of the distance sensors 112 for instance by wireless. Bluetooth. Infrared, wired connections or the like. The example controller 114 includes one or more modules configured to identify an edge (e.g., the edge 302 or supplemental edge 304). For instance, in one example the controller 114 includes a comparator module 308. The comparator module 308 is configured to compare distance measurements from the distance sensors 112 and thereby provide the results of these comparisons to the identification module 310 for appropriate analysis and identification of the edges such as the edges 302 and the supplemental edges 304. As will be described herein, in one example the comparator module 308 generates a series of standard deviations, such as standard deviation couplets based on a plurality of distance measurements made along the scan lines 306. These couplets of standard deviations are compared and one or more of the standard deviations is discarded while the other is stored (e.g., in the storage module 316) to generate an array of retained standard deviations for use by the comparator module 308 to communicate to the identification module 310 for selection of the appropriate value corresponding to the edge 302 or supplemental edge 304.

Based on the comparisons performed by the comparator module 308 the identification module 310 analyzes the data and selects a standard deviation corresponding to the location of the edge 302. As will be described herein, in one example the chosen standard deviation is the lowest value of the array for each of the scan lines 306. In such an example, the lowest standard deviation corresponds to the approximate location of the edge 302. In another example, the selection of the lowest standard deviation and accordingly the identification of the edge 302 of the crops 300 is transmitted to the indexing module 312. The indexing module 312 indexes the identified standard deviation to the appropriate scan line such as one of the scan lines 306. Optionally, the identified location of the edge 302 (for instance indexed to one or more of the scan lines 306) is delivered to and stored within a storage module 316. In one example the indexed edge location is stored in the storage module 316 with a timestamp. As will be described herein in one example the previous locations of the edges are weighted with instant determinations of the edge to provide a refined location of the edge based on the previous history of sensed and identified edges and an instantly identified edge found with the edge sensing system 110.

In another example, the controller 114 communicates with a navigation module 314. The navigation module 314 is optionally incorporated with the field computer of the harvester 100 or is a standalone system in communication with the steering system of the harvester. In one example, the navigation module 314 outputs navigation cues based on the identified location of the edge 302 (for instance according to an indexed location corresponding to one of the scan lines 306) and thereby supplies navigation instructions (e.g., left and right visual, tactile, auditory indications or the like) to the operator to facilitate steering of the harvester 100 to align one or more of the ends 116, 118 of the header 104 with the edge 302 or supplemental edge 304 depending on the orientation of the harvester 100. In another example, the navigation module 314 is in communication with the steering system of the harvester 100. The navigation module 314 uses the identified location of the edge 302 (for instance corresponding to an indexed location of the edge at one or more of the scan lines 306) to accordingly guide the harvester 100 with automated steering to along the edge 302 in the orientation shown in FIG. 3 and along the supplemental edge 304 (for instance aligned with the second end 118) when the harvester 100 is turned such as when returning on another pass in the opposed direction.

Although the example shown in FIG. 3 uses a crop 300 as the medium for sensing and identifying of an edge other features are similarly used with the edge sensing system 110 and other systems described herein. For instance, tramlines in (parallel lines in crops that allow operators to drive through fields to fertilize and spray accurately without causing damage to surrounding plants) are sensed and identified in a similar manner to the edges 302, 304. The lines of a tramline are usually about 30 cm wide and 2 meters apart while the distance between tramlines can vary from 12 meters to 30 meters. The systems and methods for sensing an edge readily detect tram lines and provide guidance information to the vehicle as discussed herein.

Figure 4A:
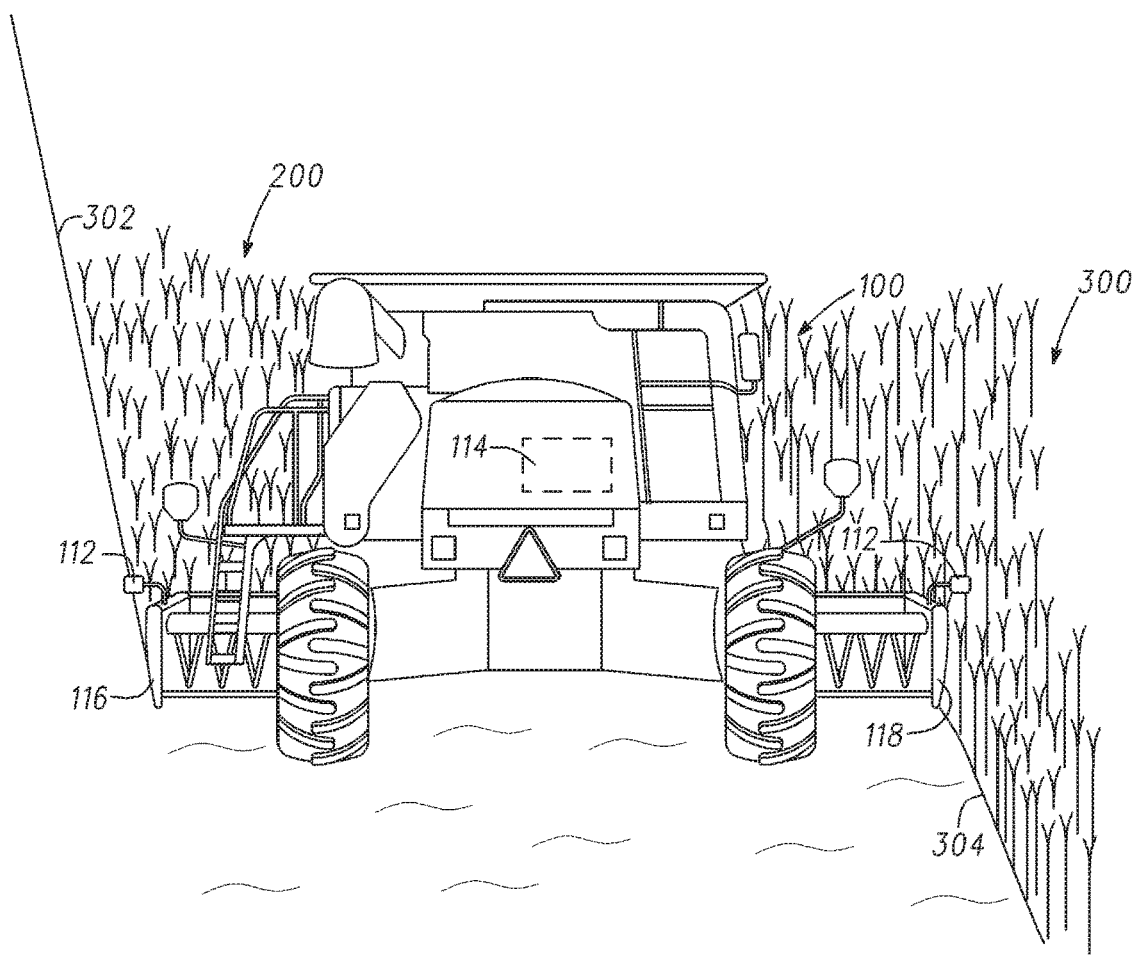
FIG. 4A is a front facing view of the vehicle of FIG. 1 including at least one sensor directed forwardly of the vehicle.

Referring now to FIG. 4A one example of the harvester 100 is shown in a rear view. The harvester 100 shown includes each of the distance sensors 112 provided on the first and second ends 116, 118 and directed forwardly relative to the harvester 100. Crops 300 previously shown in FIG. 3 are shown again in FIG. 4A. As shown, the crops 300 are in front of the harvester 100 as well as along a supplemental edge 304. The edge 302 followed by the harvester 100 is shown on the left and the first end 116 of the header 104 is approximately aligned along the edge 302. As previously described herein in one example the distance sensors 112 scan in front of the harvester 100 for instance in an arcuate fashion to accordingly gather a plurality of distance measurements for use by the controller 114 (e.g., the comparator module 308 and the identification module 310) to identify the edge 302 or supplemental edge 304 of the crops 300. In the example shown, because the edge of interest is the outside edge 302 of the field 200 the distance measurements taken by the distance sensor 112 associated with the first end 116 are of interest for this pass of the harvester 100. In an opposed configuration, for instance with the harvester 100 turned around and moving along the second portion of the crops shown in FIG. 3 the distance sensor 112 associated with the second end 118 of the header 104 is directed towards the supplemental edge 304 and accordingly gathers distance measurements along a plurality of corresponding scan lines 306 that are then used by the comparator module 308 and the identification module 310 to identify the supplemental edge 304 and facilitate the guidance of the harvester 100 along the supplemental edge 304 (for instance by aligning the second end 118 with the supplemental edge 304).

Figure 4B:
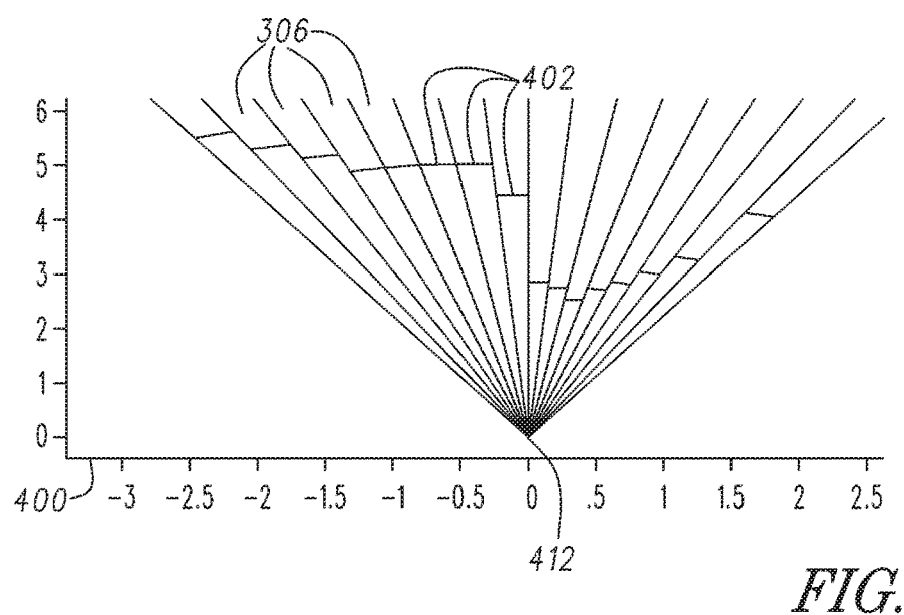
FIG. 4B is a plot of exemplary distance measurements taken along a plurality of scan lines with the distance sensor shown in FIG. 2A.

Referring now to FIG. 4B a plot 400 is shown of exemplary distance measurements 402 associated with each of the scan lines 306, for instance the scan lines corresponding to the position of the distance sensor 112 relative to the edge 302 as shown in FIGS. 4A and 3. As shown in FIG. 4B, the distance measurements 402 are larger toward the leftmost side of the plot 400 corresponding to open portions of the field to the left of the harvester 100 and the distance measurements are smaller toward the right side of the plot corresponding to the closeness of the crops 300 to the header 104. As shown there is a rapid change between the distance measurements near the middle of the plot 400 and to the right relative to the measurements to the left of middle. As described herein, the distance measurements 402 along each of the scan lines 306 are in one example used by the comparator module 308 to generate a series of standard deviations such as couplets of standard deviations based on one or more combinations of distance measurements of the scan lines 306. The standard deviations are then used in another example by the identification module 310 to identify the edge 302 (or supplemental edge 304) to facilitate corresponding guidance of the harvester 100 for instance along the edges 302, 304.

Figure 5A:
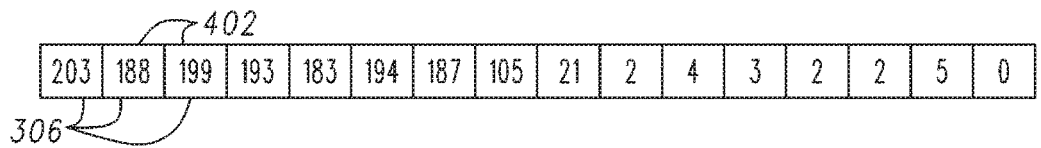
FIGS. 5A-F is an array of distance measurements, corresponding standard deviation values and an array of selected standard deviation values.

FIGS. 5A-5F show one example of the analysis of the distance measurements 402 to determine the location of the edge within an area for instance an area within the field 200. In one example, the analysis shown in FIGS. 5A-5F is conducted by one or more of the comparator module 308 or identification module 310 shown in FIG. 3. Referring first to FIG. 5A, a plurality of scan lines 306 are provided in the form of array locations filled with corresponding distance measurements 402. As shown, the distance measurements 402 decrease from left to right in FIG. 5A. In one example, the scan lines 306 correspond to 16 separate scan lines previously shown for instance in FIG. 4B. The distance measurements 402 on the right side of the array of distance measurements 402 indicate the distance sensor 112 measures a relatively close object such, as unharvested crops along one or more of the scan lines. In a similar manner the larger values on the left side of the array indicate an absence of nearby intercepting objects corresponding to an open portion of the field such as an already harvested portion of the field or the unplanted portion at the edge of the field.

Figure 5B:
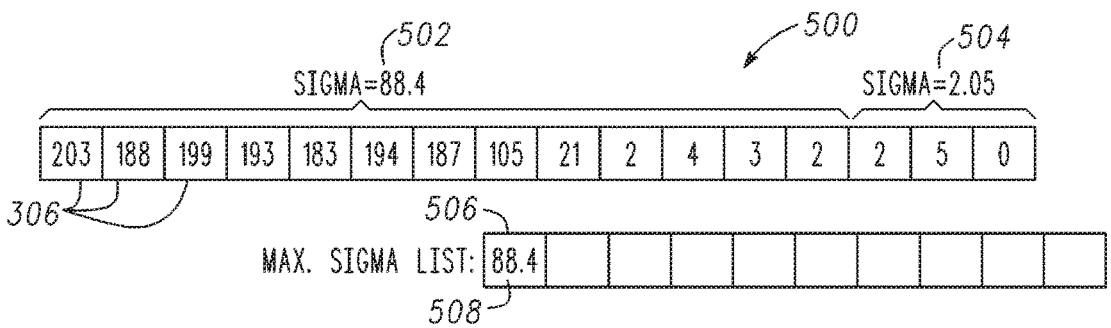

As will be described herein, FIGS. 5B-5F show one example of a method for determining the location of the edge through the use of couplets of standard deviations. Referring first to FIG. 5B, the scan lines 306 (e.g., 16 separate scan lines 306) including associated distance measurements 402 are divided into first and second standard deviations for a first couplet 500 of two standard deviations. The leftmost scan lines, for instance the 13 leftmost scan lines 306, are included in the first standard deviation 502 having a value of approximately 88.4. The second standard deviation 504 is associated with the three right most scan lines (for instance having the lower distance measurements 402) and having a standard deviation value of 2.05.

A standard deviation array 506 is provided immediately below the listing of distance measurements 402 in FIG. 5B. In the example determination of the location of the edge discussed herein the first couplet of standard deviations 500 including for instance the first and second standard deviations 502, 504 are compared (e.g., by the comparator module 308) and the larger of the two standard deviations is stored in the first array location 508 of the standard deviation array 506. The larger of the two standard deviations indicates a corresponding larger degree of deviation from the average of the values within that particular standard deviation, in this case the first standard deviation 502. A larger deviation indicates that the edge location (with a relatively low distance measurement varying significantly from the larger distance measurements) is somewhere within the 13 scan lines composing the first standard deviation 502.

Figure 5C:
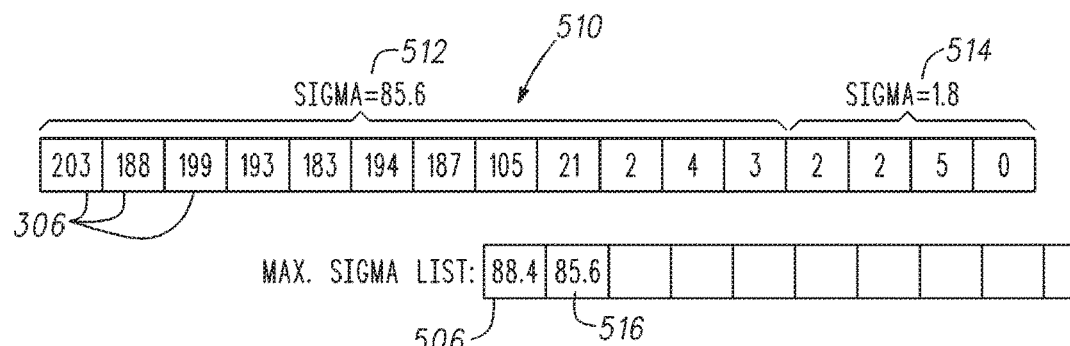

Referring now to FIG. 5C another couplet 510 of standard deviations is generated from the distance measurements 402 along the scan lines 306. As shown the first and second standard deviations 512, 514 use different subsets of scan lines 306. For instance, the first standard deviation 512 is based on the distance measurements 402 of the 12 leftmost scan lines to generate the first standard deviation value of approximately 85.6. Conversely, the second standard deviation 514 uses the four rightmost distance measurements 402. The value of the second standard deviation 514 in this example is 1.8. As before (see FIG. 5B) the second couplet of standard deviations 510 including the first and second standard deviations 512, 514 are compared and the larger of the two values is stored in the second array location 516 of the standard deviation array 506. In this example the larger standard deviation corresponds to the first standard deviation 512 and accordingly the value of 85.6 is stored in the second array location 516.

Figure 5D:
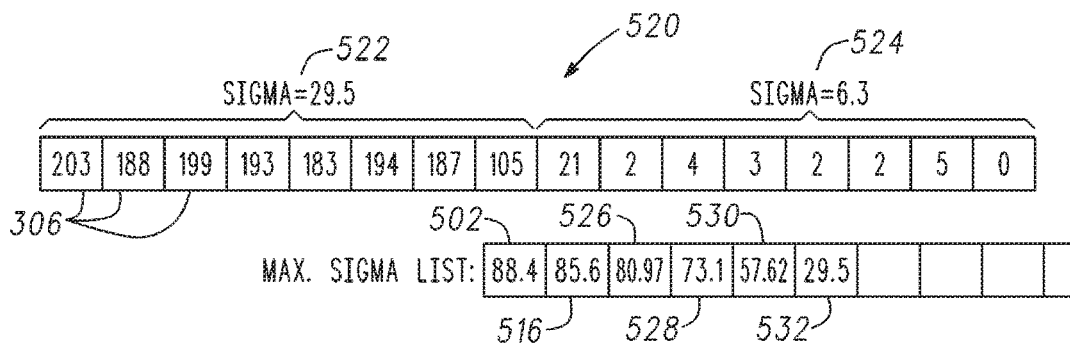

Referring now to FIG. 5D, another example of analysis of the distance measurements 402 along the scan lines 306 is conducted at a later stage of the analysis, for instance corresponding to a sixth couplet of standard deviations 520. In this example, the first standard deviation 522 corresponds to the eight leftmost scan lines 306 and the second standard deviation 524 corresponds to the eight rightmost scan lines. In the example shown the value of the first standard deviation 522 is 29.5 and the value of the second standard deviation 524 is 6.3. The value of 29.5 (being the larger of the two standard deviations of the sixth couplet 520) is stored in the sixth array location 532 of the standard deviation array 506 as shown in FIG. 5D.

Figure 5E:
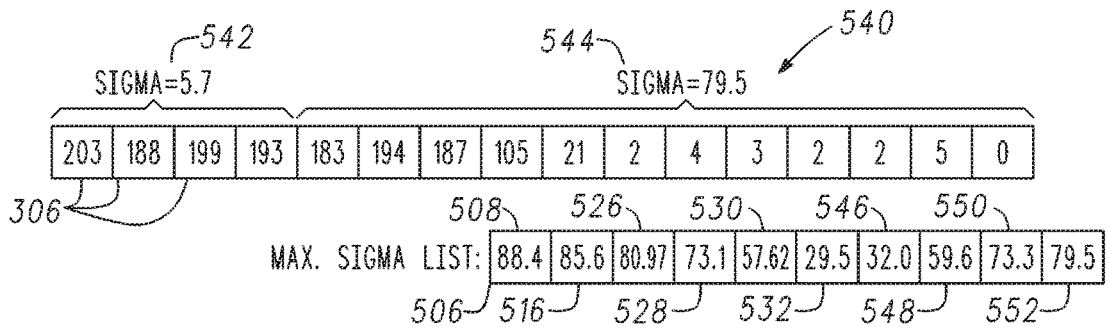

Referring now to FIG. 5E, the analysis of the distance measurements 402 continues and the standard deviation array 506 is filled. As shown the first standard deviation 542 and the second standard deviation 544 comprise a tenth couplet of standard deviations 540. In the example, the first standard deviation 542 has a value of 5.7 based on the four leftmost distance measurements 402 of the scan lines 306. Conversely, the second standard deviation includes the 12 rightmost distance measurements 402 of the scan lines 306. As shown in FIG. 5E, the second standard deviation has a value of 79.5. Accordingly the tenth array location 552 receives the larger of the standard deviation values or in this case the second standard deviation 544 having a value of 79.5. The completed standard deviation array 506 is filled with the selected standard deviations based on the comparisons performed and described above. Analysis is performed on the selected standard deviation values in the standard deviation array 506 to identify the edge location.

Figure 5F:
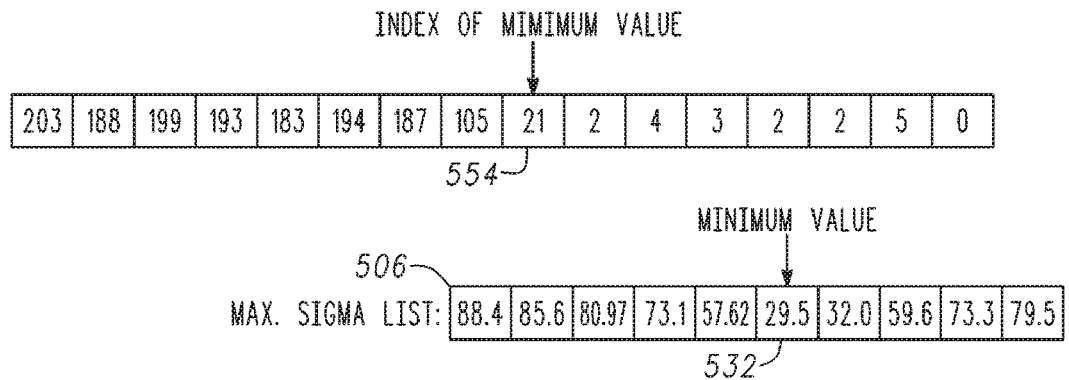

FIG. 5F shows one example for identifying the edge location based on the standard deviations stored in the standard deviation array 506. In this example, the lowest standard deviation value of the standard deviation array 506 is chosen and corresponds with the approximate location of the edge, for instance the edge 302 as shown in FIG. 3 or the supplemental edge 304 (depending on the distance sensor 112 used with either of the first or second ends 116, 118).

The smallest of the standard deviations is chosen as it roughly correlates to the lowest variability between the height measurements for one or more of the scan lines. Stated another way, the smallest standard deviation corresponds to relatively level surfaces on either side of the corresponding standard deviation's index. The smaller and larger distance measurements when incorporated into the other standard deviations raise those deviations (to the left and right of sixth array location 532), respectively and accordingly indicates the presence of the edge without identifying its location.

In one example, the sixth array location 532 including the lowest standard deviation corresponds to the scan line 554 shown in FIG. 5F, for instance the ninth scan line from the left. The controller 114 (e.g., the indexing module 312) optionally indexes the edge location to the scan line 554. By indexing the edge to the scan line 554 the controller for instance the controller 114 shown in FIG. 3 is able in one example with a navigation module 314 to provide one or more of navigation cues to an operator or provide automated steering instructions to a steering system coupled with the harvester 100 to guide the harvester into alignment with the identified edge.

In another example, the sixth array location 532 corresponding to the edge location is used to determine the distance of the identified edge from the sensor 112 (and the first or second ends 116, 118) according to a mathematical function that models the dimensions of the header 104, the location of the distance sensors 112 and uses the identified location as an input.

However, once the edge location is identified, in still another example, the edge location is refined based on weighting of an instantaneous predicted edge location and weighting of previous edge locations. In such an example, the edge location is determined by identifying a predicted edge location based on the comparison of values (e.g., as previously described herein) and incorporating previously indexed edge locations (from previous scans conducted by the distance sensor 112) preceding the current or predicted edge location measurements. The predicted edge location (e.g., the most recent determined location) and the previous indexed locations are then weighted according to their respective proximity in time relative to the determination of the predicted edge location. In one example, the location of the edge is identified based on the weighted predicted edge location and weighted previous indexed edge locations by way of an average. A predicted edge location (corresponding to an instantaneous predicted edge location) is provided a weighted value of 1 while previously stored edge locations have decreasing weighted values such as 0.9, 0.8, 0.7, 0.6 and so on (e.g., values less than 1) based on the proximity in time or distance (e.g., length of travel of the harvester 100) of the previous indexed edge locations to the instant predicted edge location. These values are summed and then divided by the number of values used to provide an average value corresponding to the identified location of the edge based on the predicted edge location and previous indexed edge locations. Optionally, indexing the location of the edge to a particular scan line such as one of the scan lines 306 includes indexing to the scan line of the plurality of adjacent scan lines based on the location of the edge determined with both the weighted predicted edge location and the weighted previous indexed edge locations.

Figure 6B:
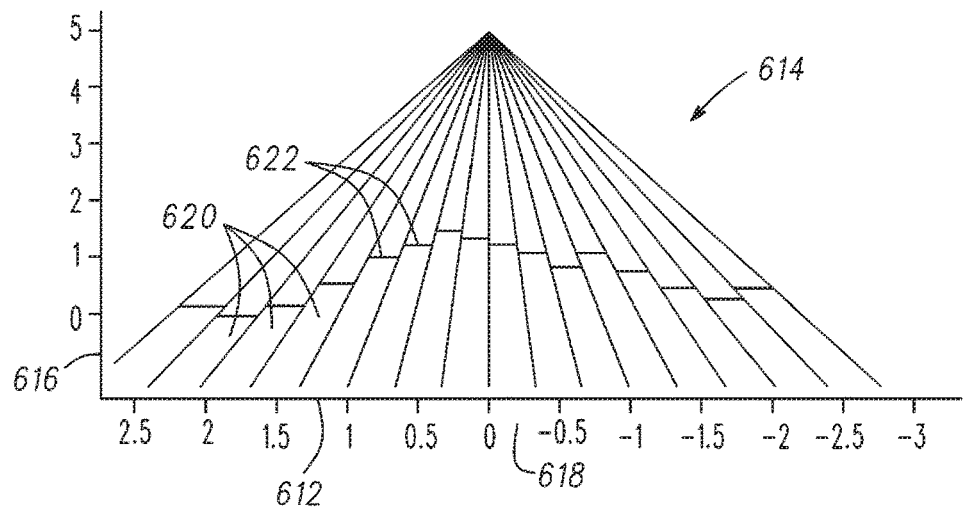
FIG. 6B is a plot exemplary height measurements taken along a plurality of scan lines with the height sensor shown in FIG. 6A.

FIGS. 6A and 6B show another example of a system including one or more edge detecting sensors configured to measure the edges of a crop such as the crop 601 and also measure the yield of the crop 601. Referring first to FIG. 6A a vehicle 600, such as a tractor, moving through a field, for instance to mow or harvest the crop 601. The vehicle 600 includes a harvest implement 602 (e.g., a mower) pulled behind the vehicle 600. In another example the vehicle 600 includes the harvest implement 602 incorporated into the vehicle 600.

One example of a yield monitor system 604 similar in at least some regards to the edge sensing system 110 described herein is provided in FIG. 6A. The yield monitor system 604 includes a distance sensor 606 positioned on the harvest implement 602 and directed rearwardly. In another example the distance sensor 606 is positioned at another location, for instance on the vehicle 600 and is directed behind the harvest implement 602. By directing the distance sensor 606 behind the harvest implement 602 measurements are made of the harvested crop 601 (e.g., after mowing). As will be described herein the distance sensor 606 (in combination with the a controller 608) when directed rearward toward the harvested crop 601 senses the edges 610 of the windrow of the crop 601, its height and its shape and uses this information with the controller 608 to develop a model of the cross-sectional area of the crop 601. The cross-sectional area when used with a length (length of travel of the implement 602) or the speed of the vehicle 600 is used to generate yield values.

The yield monitor system 604 further includes the controller 608 in communication with the distance sensor 606. In one example the controller 608 is a yield monitor associated with the vehicle 600. In another example, the controller 608 is a module configured for use with the distance sensor 606 and is accordingly incorporated into or coupled with a field computer associated with the vehicle 600.

In operation, the vehicle 600 moves through a field such as the field 200 shown in FIGS. 2 and 3 and pulls the harvest implement 602 through the field to accordingly harvest the crop 601. In one example the vehicle 600 includes supplemental systems such as the edge sensing system 110 shown in FIG. 1 and previously described herein. For instance, additional sensors such as the distance sensors 112 are used in a forward facing direction for the harvest implement 602 to accordingly guide the vehicle 600 (by one or more of navigation cues or automated steering) along the edges 302, 304 of the field as the harvest implement 602 makes multiple passes through the field to accordingly harvest the crop 601.

Returning to the operation of the vehicle 600 and the yield monitor system 604 the vehicle 600 pulls the harvest implement 602 through the field to accordingly harvest the crop into windrows or the like as shown in FIG. 6A. The distance sensor 606 is directed rearwardly relative to the harvest implement 602. The distance sensor 606 makes a series of distance or height measurements relative to the crop 601 (e.g., along scan lines) to accordingly determine one or more of the left and right edges 610 of the windrow of the crop 601, the crop height as well as the approximate shape of the windrow as the harvest implement 602 forms the windrow within the field. By measuring one or more of the edges 610, the height and the shape of the crop 601 the cross-sectional area of the crop 601 is determined. The cross-sectional area is in one example multiplied by the speed of the vehicle 600 to accordingly determine a yield rate for the crop 601 as the harvest implement 602 harvests the crop. By multiplying the yield rate by a period of time (the time the harvest implement 602 is harvesting within the field) a yield for the entirety of the field or a portion of the field depending on the time use is determined. Similarly, the cross-sectional area is multiplied by length of travel of the vehicle 600 to determine a volume yield value for that length of travel. Further, the cross-sectional area is optionally updated with multiple scans from the distance sensor 606. As the edges 610, height and shape of the crop 601 change the cross-sectional area is accordingly updated. The measured variation of the cross-sectional area of the crop 601 ensures reliable and accurate yield values.

Referring now to FIG. 6B, one example of a harvest plot 614 for the distance sensor 606 shown in FIG. 6A is provided. A sensing locus 612 corresponds to the distance sensor 606 location also shown in FIG. 6A. A plurality of scan lines 620 originate from the sensing locus and are directed outwardly for instance in a downward and rear directed fashion relative to the harvest implement 602. Each of the scan lines 620 includes a corresponding height measurement 622 also shown in FIG. 6B. The Y axis of the harvest plot 614 corresponds to the height 616 of the crop 601 and the X axis corresponds to the width 618 of the harvested crop. As generally shown in FIG. 6B the height measurement 622 forms a generally bell shaped curve corresponding to left and right edges 610 of the crop 601 shown in FIG. 6A. The bell shaped curve has a peak nearer to the middle of the plot for instance corresponding to the inner scan lines 620.

In operation the height measurement 622 with the plurality of scan lines 620 are analyzed for instance in a similar manner to the previously described analysis shown in FIGS. 5A through F and described herein. For instance, each of the edges 610 is determined from the height measurements 622 as shown in FIG. 6B. In one example, the edges 610 are identified in a manner similar to that shown in FIGS. 5A-F (e.g., by comparison of standard deviation couplets). In another example, the edges 610 are identified by comparison of distance measurements to a threshold corresponding to an approximate value for the ground (e.g., 0 inches). The height measurements 622 are indexed from each of the left and right edges 610 to accordingly describe the varying heights of the crop 601. The height measurements 622 in combination with the detected edges 610 provide a plot of the overall shape of the crop 601 along that particular scan of the distance sensor 606. In one example the height measurements between each of the edges 610 are used to model a shape of the harvested crop 601. In another example a curve is fit to the height measurement 622 to provide a mathematical function corresponding to the shape of the harvested crop 601 between each of the edges 610. By identifying the edges, heights and approximate shape of the crop 601 for a particular scan of the distance sensor 606 the controller 608 analyzes these values and determines an approximate cross-sectional area for that particular scan.

The distance sensor 606 in one example is configured to conduct repeated measurements for instance as the harvest implement 602 moves through the field to accordingly provide constant updated values for each of the edges, height and shape of the crop 601. The resulting cross-sectional areas are in one example used along with the speed of the vehicle 600 (length of travel or the like) to determine an ongoing yield rate (or yield) for the crop 601. As previously described herein in one example the yield rate is multiplied by time, for instance the time the harvest implement 602 is operated through harvested crop 601, to accordingly determine an overall yield for the crop 601 in a particular field. In another example, the yield rate determined by the measurements of the distance sensor 606 and analysis by the controller 608 is multiplied by the time the harvest implement 602 is used in each of the passes through the field to accordingly provide discrete yield values for particular sections of the field corresponding to rows, zones or the like.

Optionally, yield values are indexed to a field map corresponding to the field and are used in the next season to assist in planting and husbandry. That is to say, the yield values are used to plan and apply one or more agricultural products, seeds (hybrids, seed rate or the like) and water (e.g., irrigation) to enhance the next season yield.

Figure 7:
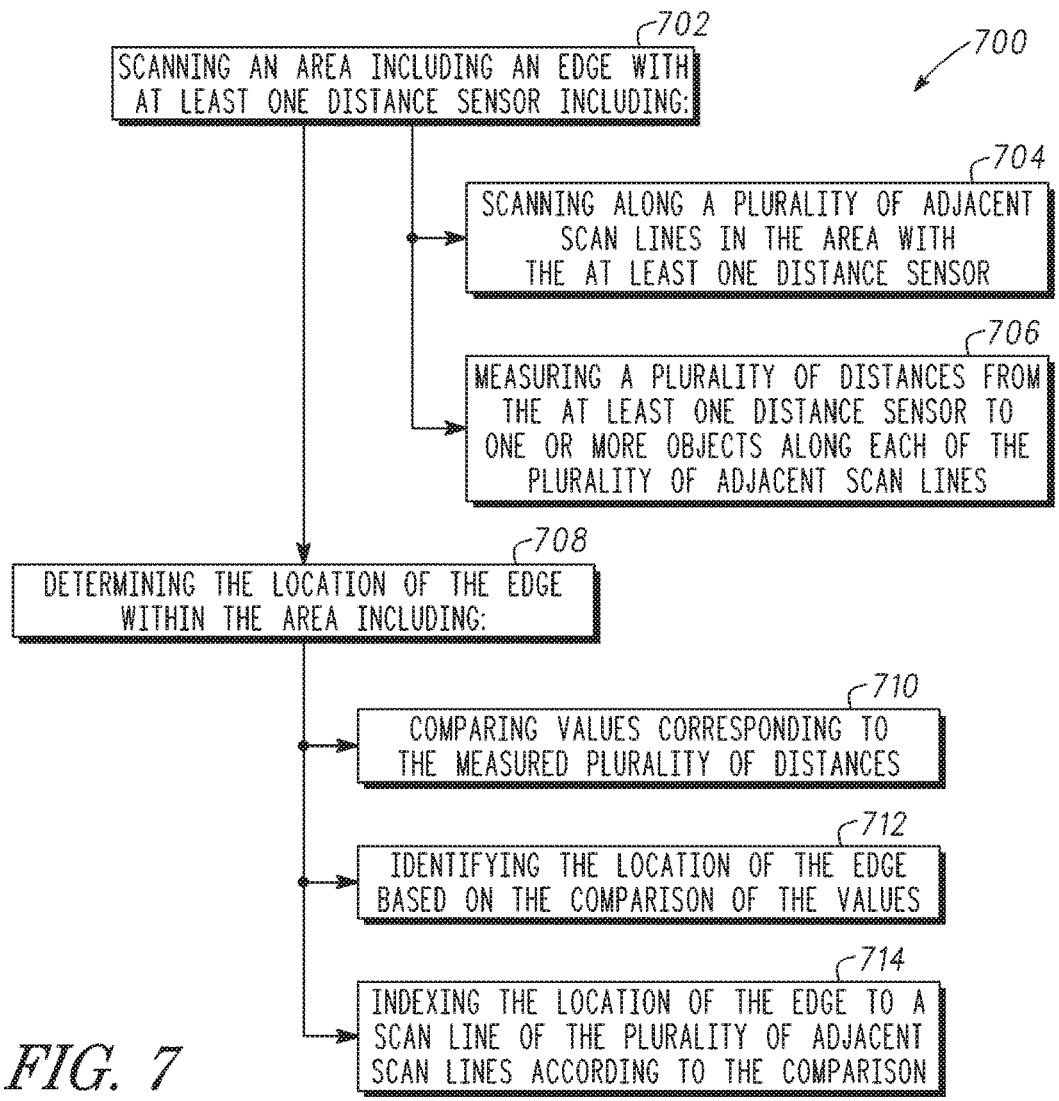
FIG. 7 is a block diagram showing one example of a method for sensing an edge of a region.

FIG. 7 shows one example of a method 700 for sensing an edge such as the edges 302, 304 shown in FIGS. 2 and 4A. In describing the method 700 reference is made to one or more components, features, functions and steps previously described herein. Where convenient, reference is made to the components, features, steps and the like with reference numerals. Reference numerals provided are exemplary and are not exclusive. For instance components, features, functions, steps and the like described in the method 700 include, but are not limited to, the corresponding numbered elements provided herein, other corresponding features described herein (both numbered and unnumbered) as well as their equivalents.

Referring to FIG. 7, the method 700 includes at 702 scanning an area including an edge with at least one distance sensor, such as the distance sensor 112 shown for instance in FIG. 1. At 704, the distance sensor 112 scans the area along a plurality of scan lines 306. As shown in FIG. 3 and in the plot 400 provided in FIG. 4B the distance sensor 112 optionally scans along a plurality of scan lines 306 at the same time or nearly the same time to provide a plurality of distance measurements 402. In one example, the at least one distance sensor 112 includes, but is not limited to, one or more of a plurality of sensing devices including ultrasonic sensors, reflectivity based sensors used in combination with a light source, an LED generator in combination with a reflectivity sensor, a laser generator in combination with a reflectivity sensor or the like. As previously described above, at 706 a plurality of distances for instance distance measurements 402 are measured from the at least one distance sensor 112 for instance a locus corresponding to the distance sensor 112 in FIG. 4B to one or more objects such as the ground or crops 300 (see FIG. 3) along each of the plurality of adjacent scan lines 306.

At 708, the method 700 further includes determining the location of the edge such as one or more of the edges 302 or supplemental edges 304 as shown in FIG. 3 within the area, such as the field 200. At 710, determining the location of the edge includes comparing values corresponding to the measured plurality of distances 710. In one example, the comparison of values includes the comparison of the distance measurements 402 to one another and comparison of those values in another example with a threshold value. In one example the threshold value is provided as a threshold difference between adjacent distance measurements 402 to accordingly signal the transition from, for instance, an open portion of the field to a filled portion of the field with unharvested crops. As shown in FIG. 3 the portion of the field to the left of the crops 300 is an open portion of the field corresponding to the edge of the field or an already harvested portion of the field without crops 300. The portion including the crops 300 to the right of the edge 302 accordingly has objects (crops) therein and provides differing distance measurements along those scan lines 306 (shorter distances between the sensor and crops) relative to the scan lines 306 extending into the open portions of the field. Where the difference between the measurements of the open portion of the field and the filled portion of the field (filled with crops 300) is greater than the threshold specified for the comparison the edge location is associated at that particular scan line to facilitate the eventual guidance of the vehicle such as the harvester 100 along the edge 302 (or supplemental edge 304 for instance where the harvester is turned in the opposed direction in FIG. 3).

In another example, comparing the values corresponding to the measured plurality of distances at 710 includes comparing the distance measurements 402 by way of values associated with the distance measurements such as standard deviation. One example of such a comparison of standard deviations is provided in FIGS. 5A through 5F. As shown therein in one example component standard deviations of couplets (e.g., first and second couplets 500, 510) are compared. The component standard deviations are based on two or more of the distance measurements 402 of a scan of the distance sensor 112. The standard deviations are compared as described herein and one of the standard deviations of each couplet (e.g., the highest) is stored in the standard deviation array 506.

The method 700 further includes at 712 identifying the location of the edge based on the comparison of the values. In an example, where the method 700 includes the use of standard deviations or values related to the distance measurements 402 after filling of the standard deviation array 506 (FIG. 5E) the array 506 is evaluated for that particular scan (a scan corresponding for instance to the measurements shown in FIG. 4B) to accordingly assess which of the standard deviations is the lowest. As shown in the example of FIG. 5E the sixth array location 532 includes the smallest standard deviation value (29.5 in that example) and thereby provides an indication that the edge location is along that scan line. At 714, the determined location of the edge for instance the edge 302 or supplemental edge 304 is indexed to the appropriate scan line in this case the eighth scan line of the distance measurements originally provided in FIG. 5A. By indexing the location of the edge to a scan line the controller such as the controller 114 of the edge sensing system 110 is able to provide navigational cues to an operator or automated steering instructions to an automated steering system to accordingly guide the vehicle 100 such as the harvester into alignment with the identified edge such as the edge 302 or 304 depending on the orientation and direction of movement of the harvester 100. Optionally, the identifying and indexing steps 712, 714 (and described in detail herein) are consolidated and the identification of the location automatically includes the indexing of the location to a scan line previously associated with the relevant standard deviation.

As shown in FIG. 3, the harvester 100 is guided to align the header 104, for instance a first end of the header 116, with the edge 302 to ensure a full swath cut of the header 104. The scans made by the distance sensor 112 are in one example repeated at a set frequency or variable frequency depending on the movement of the harvester 100. By repeating the scans updated distance measurements 402 are in the manner shown in FIG. 5A to accordingly facilitate the determination of updated edges 302, 304 of the crops 300 in the field 200. Accordingly, as the vehicle 100 moves through a region such a field 200 as shown in FIG. 3 the distance measurements 402 are constantly updated along each of the scan lines 306 according to changes in the edge (e.g., linear or non-linear edges) and the edge determination is thereby constantly updated to provide accurate ongoing identification of the edge 302, 304.

Although the examples described herein are described with regard to a harvester 100, a vehicle 600 such as a tractor or the like the vehicles and systems described herein are not so limited and may instead be used with any system including vehicles that would benefit from the sensing and identification of an edge. For instance, the edge sensing system 110 as well as the yield monitor system 604 or the like is used with other vehicles that remove material from locations including, but not limited to, loaders, road graders, snowplows, mowers or the like. In another example, the edge sensing system 110 is used with other vehicles to provide automated steering and edge or wall avoidance for such vehicles. By using the distance sensors 112 to scan for the edges relative to open regions (e.g., walls, guardrails, objects, debris or the like relative to open roadways, hallways or the like) the edge sensing system 110 identifies edges and facilitates guidance of the vehicle, such as the harvester 100, tractor 600 or other vehicles (e.g., cars, trucks, tractor trailers, loaders, robotic vehicles, forklifts and the like) to travel along or navigate away from walls and objects with the vehicle.

Several options for the method 700 follow. In one example and as previously described herein comparing the values corresponding to the measured plurality of distances (e.g., the distance measurements 402) includes generating an array of standard deviations, such as the standard deviation array 506 shown in FIG. 5B based on the measured plurality of distances. In another example, generating the array of standard deviations 506 includes generating a standard deviation couplet such as the first couplet of standard deviations 500 shown in FIG. 5B. Each standard deviation couplet includes a first standard deviation 502 and a second standard deviation 504 with each of the standard deviations based on a plurality of differing values from the distance measurements 402 provided along each of the scan lines 306.

In one example, the higher of the first and second standard deviations 502, 504 of a couplet is assigned to a stored location of a plurality of stored locations in the standard deviation array 506. The generating of the standard deviation couplet and assigning of the higher of the first and second standard deviations 502, 504 is repeated for each of the plurality of stored locations of the standard deviation array 506. One example of the generation and comparison of standard deviations is shown in FIGS. 5A-5F and described herein. As previously described herein, the edge location is identified from the standard deviation array 506 by selection of the lowest of the standard deviations stored in the standard deviation array 506. In one example the edge location corresponds to a cut edge of an unharvested agricultural crop such as the crop 300 shown for instance in FIGS. 3 and 4A. In another example, the edge location corresponds to the edge of a windrow of a harvested crop, snow, gravel rocks, a wall, object or objects, debris or the like.

In still another example, the method 700 further includes navigating a vehicle, such as one or more of the harvester 100 or vehicle 600 (e.g., a tractor) shown in FIGS. 1 and 6A to follow along the identified or indexed edge 302, 304. In another example, navigating the vehicle includes one of automated steering of the vehicle for instance with the controller 114 shown in FIG. 1 or 3 or providing navigation cues for an operator of the harvester 100 (for instance a combine).

In still another example the method 700 includes cutting an agricultural crop 300 along the indexed edge such as the edge 302 and generating a supplemental edge 304 by way of the harvesting or cutting provided by the harvester 100. The method 700 further includes repeating scanning the area and determining the location of the supplemental edge 304 for instance on later passes of the harvester 100 or subsequent passes by a trailing vehicle such as staggered combines working in concert with the harvester 100 shown for instance in FIGS. 1 and 4A.

In still another example, identifying the location of the edge such as the edge 302, 304 based on the comparison of values includes identifying a predicted edge location based on the comparison of values (e.g., as previously described herein) and storing previously indexed edge locations for instance from previous scans conducted by the distance sensor 112 preceding the current or predicted edge location measurements. The predicted edge location (e.g., the most recent determined location) and the previous indexed locations are then weighted according to their respective proximity in time relative to the determination of the predicted edge location. In one example, the location of the edge is identified based on the weighted predicted edge location and weighted previous indexed edge locations by way of an average. A predicted edge location (corresponding to an instantaneous predicted edge location) is provided a weighted value of 1 while previously stored edge locations have decreasing weighted values such as 0.9, 0.8, 0.7, 0.6 and so on based on the proximity in time of the previous indexed edge locations to the instant predicted edge location. These values are summed and then divided to provide an average value corresponding to the identified location of the edge based on the predicted edge location and previous indexed edge locations. Optionally, indexing the location of the edge to a particular scan line such as one of the scan lines 306 includes indexing to the scan line of the plurality of adjacent scan lines based on the location of the edge determined with both the weighted predicted edge location and the weighted previous indexed edge locations.

In yet another example, the edge described in the method 700 includes a first edge 610 of a windrow of an agricultural crop 601. The method 700 further includes scanning the area including a second edge 610 of the windrow of the crop 601 with the at least one distance sensor (e.g., the distance sensor 606 shown in FIG. 6A). The windrow of the crop 601 is scanned between at least the first and second edges 610 to determine one or more of the height and shape of the windrow of the harvested crop 601. The cross-sectional area of the windrow of the crop 601 is determined between the first and second edges 610 (e.g., by modeling of the crop shape, approximation using the plurality of height measurements 622, curve fitting and integration or the like). In another example, the method 700 further includes determining a crop yield for at least a portion of the region based on the determined cross-sectional area and one or more of the speed of a vehicle including at least one distance sensor or distance traveled by the vehicle. In yet another example, the method 700 further includes changing one or more of the application of agricultural products (such as fertilizers, herbicides, pesticides or the like), seeds or water according to the determined crop yield. For instance, the yield values determined with the method 700 as described herein are used in one or more of planting or husbandry maps in the next season to accordingly adjust the planting of seeds (seed rate, type or the like), application of agricultural products (fertilizer, herbicide, pesticide or the like) or application of water (e.g., irrigation).

VARIOUS NOTES & EXAMPLES

Example 1 can include subject matter such as can include a system for sensing an edge of a region comprising: at least one distance sensor configured for coupling with a vehicle, the at least one distance sensor configured to detect a plurality of distances of objects along a plurality of adjacent scan lines; and a controller in communication with the at least one distance sensor, the controller configured to determine a location of an edge of a region within the plurality of adjacent scan lines, the controller includes: a comparator module configured to compare values corresponding to the detected plurality of distances, and an identification module configured to identify the location of the edge of the region according to the compared values.

Example 2 can include, or can optionally be combined with the subject matter of Example 1, to optionally include wherein the at least one distance sensor includes at least one reflectivity based distance sensor.

Example 3 can include, or can optionally be combined with the subject matter of one or any combination of Examples 1 or 2 to optionally include wherein the at least one distance sensor includes a light emitting diode (LED) unit and a reflectivity sensing unit.

Example 4 can include, or can optionally be combined with the subject matter of one or any combination of Examples 1-3 to optionally include wherein the LED unit generates at least 16 scan lines and the reflectivity sensing unit is configured to sense the at least 16 scan lines.

Example 5 can include, or can optionally be combined with the subject matter of one or any combination of Examples 1-4 to optionally include wherein the at least one distance sensor includes at least one of a laser generator and a reflectivity sensing unit or an ultrasonic sensor.

Example 6 can include, or can optionally be combined with the subject matter of Examples 1-5 to optionally include wherein the comparator module is configured to generate an array of standard deviations based on the plurality of distances.

Example 7 can include, or can optionally be combined with the subject matter of Examples 1-6 to optionally include wherein the comparator module is configured to generate an array of standard deviations including: generation of standard deviation couplets, each standard deviation couplet including a first standard deviation of a first subset of the plurality of distances and a second standard deviation of a second subset of the plurality of distances, assignment of the higher of the first and second standard deviations to a stored location of a plurality of stored locations in the array of standard deviations, and repeating generation and assignment for each of the plurality of stored locations based on differing first and second subsets of the measured plurality of distances.

Example 8 can include, or can optionally be combined with the subject matter of Examples 1-7 to optionally include wherein the identification module is configured to identify the location of the edge of the region by selecting the lowest of the assigned standard deviations from the plurality of stored locations in the array of standard deviations.

Example 9 can include, or can optionally be combined with the subject matter of Examples 1-8 to optionally include wherein the controller includes an indexing module configured to index the identified location of the edge to a scan line of the plurality of adjacent scan lines corresponding to the selected lowest of the assigned standard deviations.

Example 10 can include, or can optionally be combined with the subject matter of Examples 1-9 to optionally include a navigation module in communication with the controller, the navigation module configured to navigate a vehicle according to the identified location of the edge of the region.

Example 11 can include, or can optionally be combined with the subject matter of Examples 1-10 to optionally include a vehicle configured to sense an edge of a region comprising: a vehicle body; at least one distance sensor coupled with the vehicle, the at least one distance sensor configured to detect a plurality of distances of objects along a plurality of adjacent scan lines; a controller in communication with the at least one distance sensor, the controller configured to determine a location of an edge of a region within the plurality of adjacent scan lines, the controller includes: a comparator module configured to compare values corresponding to the detected plurality of distances, and an identification module configured to identify the location of the edge of the region according to the compared values; and a navigation module in communication with the controller, the navigation module configured to navigate the vehicle to the identified location of the edge.

Example 12 can include, or can optionally be combined with the subject matter of Examples 1-11 to optionally include wherein the at least one distance sensor includes at least one reflectivity based distance sensor.

Example 13 can include, or can optionally be combined with the subject matter of Examples 1-12 to optionally include wherein the comparator module is configured to generate an array of standard deviations based on the plurality of distances.

Example 14 can include, or can optionally be combined with the subject matter of Examples 1-13 to optionally include wherein the comparator module is configured to generate an array of standard deviations including: generation of standard deviation couplets, each standard deviation couplet including a first standard deviation of a first subset of the plurality of distances and a second standard deviation of a second subset of the plurality of distances, assignment of the higher of the first and second standard deviations to a stored location of a plurality of stored locations in the array of standard deviations, and repeating generation and assignment for each of the plurality of stored locations based on differing first and second subsets of the measured plurality of distances.

Example 15 can include, or can optionally be combined with the subject matter of Examples 1-14 to optionally include wherein the identification module is configured to identify the location of the edge of the region by selecting the lowest of the assigned standard deviations from the plurality of stored locations in the array of standard deviations.

Example 16 can include, or can optionally be combined with the subject matter of Examples 1-15 to optionally include wherein the controller includes an indexing module configured to index the identified location of the edge to a scan line of the plurality of adjacent scan lines corresponding to the selected lowest of the assigned standard deviations.

Example 17 can include, or can optionally be combined with the subject matter of Examples 1-16 to optionally include wherein the vehicle includes a vehicle including a cutting implement having at least one end, and the navigation module is configured to navigate the at least one end of the cutting implement into alignment with the identified location of the edge.

Example 18 can include, or can optionally be combined with the subject matter of Examples 1-17 to optionally include wherein the at least one distance sensor includes a first distance sensor associated with a first vehicle side and a second distance sensor associated with a second vehicle side, the first distance sensor and the controller configured to identify the location of the edge where the location of the edge is closer to the first vehicle side than the second vehicle side, and the second distance sensor and the controller configured to identify the location of the edge where the location of the edge is closer to the second vehicle side than the first vehicle side.

Example 19 can include, or can optionally be combined with the subject matter of Examples 1-18 to optionally include a method for sensing an edge of a region comprising: scanning an area including an edge with at least one distance sensor, scanning the area including: scanning along a plurality of adjacent scan lines in the area with the at least one distance sensor; measuring a plurality of distances from the at least one distance sensor to one or more objects along each of the plurality of adjacent scan lines; and determining the location of the edge within the area including: comparing values corresponding to the measured plurality of distances, identifying the location of the edge based on the comparison of the values, and indexing the location of the edge to a scan line of the plurality of adjacent scan lines according to the comparison.

Example 20 can include, or can optionally be combined with the subject matter of Examples 1-19 to optionally include wherein comparing the values corresponding to the measured plurality of distances includes generating an array of standard deviations based on the measured plurality of distances.

Example 21 can include, or can optionally be combined with the subject matter of Examples 1-20 to optionally include wherein generating the array of standard deviations includes: generating a standard deviation couplet, each standard deviation couplet including a first standard deviation of a first subset of the measured plurality of distances and a second standard deviation of a second subset of the measured plurality of distances, assigning the higher of the first and second standard deviations to a stored location of a plurality of stored locations in the array of standard deviations, and repeating generating and assigning for each of the plurality of stored locations based on differing first and second subsets of the measured plurality of distances.

Example 22 can include, or can optionally be combined with the subject matter of Examples 1-21 to optionally include wherein identifying the location of the edge includes selecting the lowest of the assigned standard deviations, and indexing the location of the edge to the scan line of the plurality of adjacent scan lines includes indexing the location of the edge to the scan line corresponding to the selected lowest assigned standard deviation.

Example 23 can include, or can optionally be combined with the subject matter of Examples 1-22 to optionally include wherein scanning the area including the edge includes scanning the area including a cut edge of an agricultural crop.

Example 24 can include, or can optionally be combined with the subject matter of Examples 1-23 to optionally include wherein measuring the plurality of distances includes measuring based on reflectivity from the one or more objects.

Example 25 can include, or can optionally be combined with the subject matter of Examples 1-24 to optionally include wherein scanning the area including the edge with the at least one distance sensor includes scanning with at least one distance sensor including a laser generator and reflectivity sensing unit.

Example 26 can include, or can optionally be combined with the subject matter of Examples 1-25 to optionally include wherein scanning the area including the edge with the at least one distance sensor includes scanning with at least one distance sensor including a light emitting diode (LED) unit and a reflectivity sensing unit.

Example 27 can include, or can optionally be combined with the subject matter of Examples 1-26 to optionally include navigating a vehicle to follow along the indexed edge.

Example 28 can include, or can optionally be combined with the subject matter of Examples 1-27 to optionally include wherein navigating includes one of automated steering of the vehicle and providing navigation cues for an operator.

Example 29 can include, or can optionally be combined with the subject matter of Examples 1-28 to optionally include cutting an agricultural crop along the indexed edge, and generating a supplemental edge with the cutting; and repeating scanning the area and determining the location of the supplemental edge.

Example 30 can include, or can optionally be combined with the subject matter of Examples 1-29 to optionally include wherein identifying the location of the edge based on the comparison of values includes: identifying a predicted edge location based on the comparison of values, storing previous indexed edge locations, weighting the predicted edge location and the previous indexed edge locations according to the respective proximity in time relative to the time of the predicted edge location, and identifying the location of the edge based on the weighted predicted edge location and previous indexed edge locations.

Example 31 can include, or can optionally be combined with the subject matter of Examples 1-30 to optionally include wherein indexing the location of the edge to the scan line includes indexing the location of the edge based on the weighted predicted edge location and previous indexed edge locations to the scan line of the plurality of adjacent scan lines.

Example 32 can include, or can optionally be combined with the subject matter of Examples 1-31 to optionally include wherein the edge includes a first edge of a windrow of an agricultural crop, the method comprising: scanning the area including a second edge of the windrow of the crop with the at least one distance sensor; determining the location of the second edge of the window of the crop; determining a windrow width between the first and second edges; scanning the windrow of the crop between at least the first and second edges; determining one or more of a height and shape of the windrow of the crop; and determining the cross sectional area of the windrow of the crop between the first and second edges.

Example 33 can include, or can optionally be combined with the subject matter of Examples 1-32 to optionally include determining a crop yield for at least a portion of the field based on the determined cross sectional area and one or more of the speed of a vehicle or distance traveled of the vehicle.

Example 34 can include, or can optionally be combined with the subject matter of Examples 1-33 to optionally include changing one or more of the application of agricultural products, seeds or water according to the determined crop yield.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for determining a yield value of a crop comprising:
   at least one distance sensor configured for coupling with a vehicle, the at least one distance sensor configured to monitor a plurality of distances of one or more crop rows along a plurality of adjacent scan lines including:
   first and second edges of the one or more crop rows for an agricultural crop; and
   a crop profile of the one or more crop rows between the first and second edges;
   a controller in communication with the at least one distance sensor, the controller includes:
   an edge sensing system configured to identify the first and second edges of the one or more crop rows from the plurality of distances, the edge sensing system having:
   a comparator module configured to generate an array of standard deviations based on the plurality of distances and compare the standard deviations; and
   an identification module configured to identify the first and second edges of the one or more crop rows by identifying the lowest standard deviation of the array of standard deviations;
   a yield monitor system configured to determine at least one yield value of the agricultural crop, the yield monitor system having:
   a height array including measured distances of the plurality of distances between the identified first and second edges, the measured distances corresponding to heights of the crop profile; and
   a yield generator configured to generate a yield value corresponding to a cross sectional area of the crop profile based on the heights of the crop profile.

2. The system of claim 1, wherein the crop profile includes the height and shape of the one or more crop rows.

3. The system of claim 2, wherein the shape of the one or more crop rows includes crop height measured along scan lines of the plurality of adjacent scan lines.

4. The system of claim 1, wherein the one or more crop rows include one or more cut crop rows.

5. The system of claim 1, wherein the yield value includes one or more of a yield rate or a yield volume.

6. The system of claim 1, wherein the at least one distance sensor includes a reflectivity sensing unit and one or more of a light emitting diode (LED) unit or a laser generator.

7. The system of claim 1 comprising a navigation module in communication with the controller, the navigation module configured to navigate the vehicle according to the identified first or second edges.

8. A system for determining a yield value of a crop comprising:
   at least one distance sensor configured for coupling with a vehicle, the at least one distance sensor configured to monitor a plurality of distances of one or more cut crop rows along a plurality of adjacent scan lines including:
   a first edge of the one or more cut crop rows for an agricultural crop; and
   a second edge of the one or more cut crop rows; and
   a controller in communication with the at least one distance sensor, the controller includes:
   a comparator module configured to generate an array of standard deviations based on the plurality of distances compare the standard deviations; and
   an identification module configured to identify the first and second edges of the one or more crop rows by identifying the lowest standard deviation of the array of standard deviations.

9. The system of claim 8, wherein the at east one distance sensor includes at least one reflectivity based distance sensor.

10. The system of claim 8, wherein the at least one distance sensor includes a reflectivity sensing unit and one or more of a light emitting diode (LED) unit or a laser generator.

11. The system of claim 8, wherein the controller includes an indexing module configured to index the identified location of one or more of the first or second edges to a scan line of the plurality of adjacent scan lines corresponding to the identified lowest of the selected standard deviations.

12. The system of claim 8 comprising a navigation module in communication with the controller, the navigation module configured to navigate the vehicle according to one or more of the identified first or second edges.

13. The system of claim 8 comprising a yield monitor system configured to determine at least one yield value of the agricultural crop, the yield monitor system having:
   a height array including measured distances of the plurality of distances between the identified first and second edges of the one or more cut crop rows, the measured distances corresponding to heights of a crop profile;
   a yield generator configured to generate a yield value corresponding to a cross sectional area of the crop profile based on the heights of the crop profile.

14. The system of claim 8, wherein the one or more cut crop rows include one or more windrows.

* * * * *